US006725273B1

United States Patent
Mäenpää

(10) Patent No.: US 6,725,273 B1
(45) Date of Patent: Apr. 20, 2004

(54) POINT-TO-POINT PREFIX PROTOCOL

(75) Inventor: Jari Mäenpää, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/464,141

(22) Filed: Dec. 16, 1999

(51) Int. Cl.$^7$ .................. G06F 15/16; G06F 15/173; H04J 3/22; H04L 12/66
(52) U.S. Cl. .................. 709/230; 709/232; 709/223; 709/235; 709/248; 370/465; 370/467; 370/356; 370/355
(58) Field of Search .................. 709/230, 232, 709/223, 227, 235; 370/465, 467, 356, 355

(56) References Cited

U.S. PATENT DOCUMENTS

| 4,750,109 A | * | 6/1988 | Kita ..................... 709/227 |
| 5,056,058 A | * | 10/1991 | Hirata et al. .......... 709/230 |
| 5,142,528 A | * | 8/1992 | Kobayashi et al. ..... 370/469 |
| 5,878,120 A | | 3/1999 | O'Mahony ............. 379/93.09 |
| 6,005,851 A | * | 12/1999 | Craddock et al. ...... 370/329 |
| 6,115,393 A | * | 9/2000 | Engel et al. .......... 370/469 |
| 6,173,333 B1 | * | 1/2001 | Jolitz et al. .......... 709/238 |
| 6,219,706 B1 | * | 4/2001 | Fan et al. ............. 709/232 |
| 6,363,429 B1 | * | 3/2002 | Ketcham ............... 709/232 |
| 6,504,851 B1 | * | 1/2003 | Abler et al. ........... 370/466 |

FOREIGN PATENT DOCUMENTS

EP 0279232 8/1985

OTHER PUBLICATIONS

RFC 1661, W. Simpson, Editor, Network Working Group Request for Comments, "The Point–to–Point Protocol (PPP)," Jul. 1994.*

RFC 1661, W. Simpson, Editor, Network Working Group Request for Comments, "The Point–to–Point Protocol (PPP)", Jul. 1994.

RFC 1662, Network Working Group Request for Comments, W. Simpson, Editor, "PPP in HDLC–like Framing", Jul. 1994.

Information Technology—Telecommunications and Information Exchange Between Systems—High–level data link control (HDLC) Procedures—Frame Structure, ISO/IEC International Standard 3309:1993 (E).

"Terminal for Low Bit–Rate Multimedia Communication", ITU–T H. 324 (02/98) Series H: Audiovisual and Multimedia Systems: Infrastructure of Audiovisual Services—Systems and Terminal Equipment for Audiovisual Services.

ETSI TS 101 369 v6.3.0 (1999–03), Digital Cellular Telecommunications System (Phase 2+); Terminal Equipment to Mobile Station (TE–MS) multiplexer Protocol, GSM 07.20 version 6.3.0 Release 1997.

* cited by examiner

Primary Examiner—Dung C. Dinh
Assistant Examiner—Anita Choudhary

(57) ABSTRACT

A single protocol is used by sending systems to inform receiving systems what kind of data is arriving after the notification by this prefix protocol. The payload protocol follows, and is the real protocol that is used to exchange the data after the prefix protocol session. Although the PPP protocol allowed a negotiation of the used network protocol in the NCP, the PPP enforced that payload protocol data would always be carried inside HDLC framing. The payload protocol can be any protocol, and is only notified by prefix protocol HDLC frames, and therefore payload protocol data can be transferred inside any kind of protocol that is supported by a handler within the receiving system.

24 Claims, 7 Drawing Sheets

POINT-TO-POINT PREFIX PROTOCOL

FIELD OF THE INVENTION

The present invention relates to the field of telecommunications and, more particularly, to the efficient routing of data packets and data streams to the correct applications.

BACKGROUND OF THE INVENTION

The Internet and telecommunication world has developed several data protocols to be carried over point-to-point links for different kinds of purposes. There is, for instance, the PPP protocol for delivering network layer data over point-to-point links, the H.324 Standard for delivering multimedia data, etc.

On the other hand, modern multimedia terminals and communicator-style devices are being developed that are potentially able to handle many different kinds of data protocols carried over point-to-point links. An example is the Nokia 9110 Communicator.

The problem is that there is no common protocol or format that these protocols, for instance, PPP and H.324, may share. This makes it difficult to implement a data parser or recognizer that routes the incoming data to the correct handler in terminals that can interpret several data protocols, such as PPP and H.324.

The PPP protocol allows a negotiation of the used network protocol in the Network Control Protocol (NCP) phase of the PPP protocol. However, the PPP enforces that the payload protocol data will always be carried inside High-Level Data Link Control (HDLC) framing.

It would be easier to implement the routing of the data stream to the right handler if there were some way to tell what protocol data is coming in the data stream in order to allow transmission using the identified payload protocol, i.e., without enforcing the payload protocol data to be carried inside HDLC framing.

DISCLOSURE OF INVENTION

According to a first aspect of the invention, a method for sending information from a sending terminal through a network to a receiving terminal comprises the steps of sending a selected number of prefix protocol packets indicative of a payload protocol of a packet to follow through said network to said receiving terminal, and sending said payload protocol packet to said receiving terminal immediately after sending said selected number of prefix protocol packets. The prefix protocol is an agreed-upon protocol such as HDLC. The payload protocol will be one of various possible protocols to follow the prefix protocol, such as H.324, PPP, or the like. In this way, the payload protocol can be different from the prefix protocol and does not have to be carried inside some other protocol.

According further to the first aspect of the invention, the sending of said protocol packets continues up to said selected number unless a message is received from said receiving terminal indicating either that the payload protocol is not supported in the receiving terminal followed by halting said sending of prefix protocol packets, or that the receiving terminal is ready to receive said payload packet followed by said sending said payload protocol packet after sending a number of prefix protocol packets less than said selected number.

According still further to the first aspect of the invention, a terminal for sending information through a network to a receiving terminal comprises means for sending a selected number of prefix protocol packets indicative of a payload protocol of a packet to follow through said network to said receiving terminal, and means for sending said payload protocol packet to said receiving terminal immediately after sending said selected number of prefix protocol packets.

Still further according to the first aspect of the invention, the terminal wherein sending of said protocol packets continues up to said selected number unless a message is received from said receiving terminal indicating either (1) that the payload protocol is not supported in the receiving terminal followed by terminating sending of further packets, or (2) that the receiving terminal is ready to receive said payload packet followed by said sending said payload t\protocol packet after sending a number of prefix protocol packets less than said selected number.

According to a second aspect of the invention, a method of receiving information in a receiving terminal through a network from a sending terminal comprises the steps of receiving a selected number of prefix protocol packets indicative of a payload protocol of a packet to follow after said selected number of prefix protocol packets for synchronizing on said prefix protocol packets and for readying a handler of said payload protocol packets, and receiving said payload protocol packet.

In further accord with the second aspect of the invention, the method further comprises the steps of determining before receiving all of said selected number of prefix protocol packets that said payload protocol is supported in said receiving terminal, and sending a message from said receiving terminal to said sending terminal that said payload protocol is supported in said receiving terminal for causing said sending terminal to stop sending said prefix protocol packets and immediately sending said payload protocol packet.

According further to the second aspect of the invention, a terminal for receiving information through a network from a sending terminal comprises means for receiving a selected number of prefix protocol packets indicative of a payload protocol of a packet to follow after said selected number of prefix protocol packets for synchronizing on said prefix protocol packets and for readying a handler of said payload protocol packets, and means for receiving said payload protocol packet.

Still further according to the second aspect of the invention, the terminal further comprises means for determining before receiving all of said selected number of prefix protocol packets that said payload protocol is supported in said receiving terminal, and means for sending a message from said receiving terminal to said sending terminal that said payload protocol is supported in said receiving terminal for causing said sending terminal to stop sending said prefix protocol packets and immediately sending said payload protocol packet.

According to a third aspect of the invention, a method of communicating information between a sending terminal and a receiving terminal over a network comprises the steps of sending a selected number of prefix protocol packets indicative of a payload protocol of a packet to follow through said network to said receiving terminal, receiving in said receiving terminal said selected number of prefix protocol packets indicative of said payload protocol of said packet to follow after said selected number of prefix protocol packets for synchronizing on said prefix protocol packets and for readying a handler of said payload protocol packets, sending said payload protocol packet to said receiver immediately after sending said selected number of prefix protocol packets, and receiving in said receiving terminal said payload protocol packet.

In further accord with the third aspect of the invention, the method further comprises the steps of determining in said receiver before receiving all of said selected number of prefix protocol packets that said payload protocol is supported or that said receiver is ready to receive said payload packet followed by said sending of said payload protocol packet from said sending terminal to said receiving terminal.

Still further according to the third aspect of the invention, an apparatus comprising a sending terminal and a receiving terminal for communicating information over a network further comprises means for sending in said sending terminal a selected number of prefix protocol packets indicative of a payload protocol of a packet to follow through said network to said receiving terminal, means for receiving in said receiving terminal said selected number of prefix protocol packets indicative of said payload protocol of said packet to follow after said selected number of prefix protocol packets for synchronizing on said prefix protocol packets and for readying a handler of said payload protocol packets, means for sending on said sending terminal said payload protocol packet to said receiving terminal immediately after sending said selected number of prefix protocol packets, and means for receiving in said receiving terminal said payload protocol packet.

In still further accord with the third aspect of the invention, the apparatus further comprises means for determining in said receiver before receiving all of sale selected number of prefix protocol packets that said payload protocol is supported or that said receiver is ready to receive said payload packet followed by said sending of said payload protocol packet from said sending terminal to said receiving terminal.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
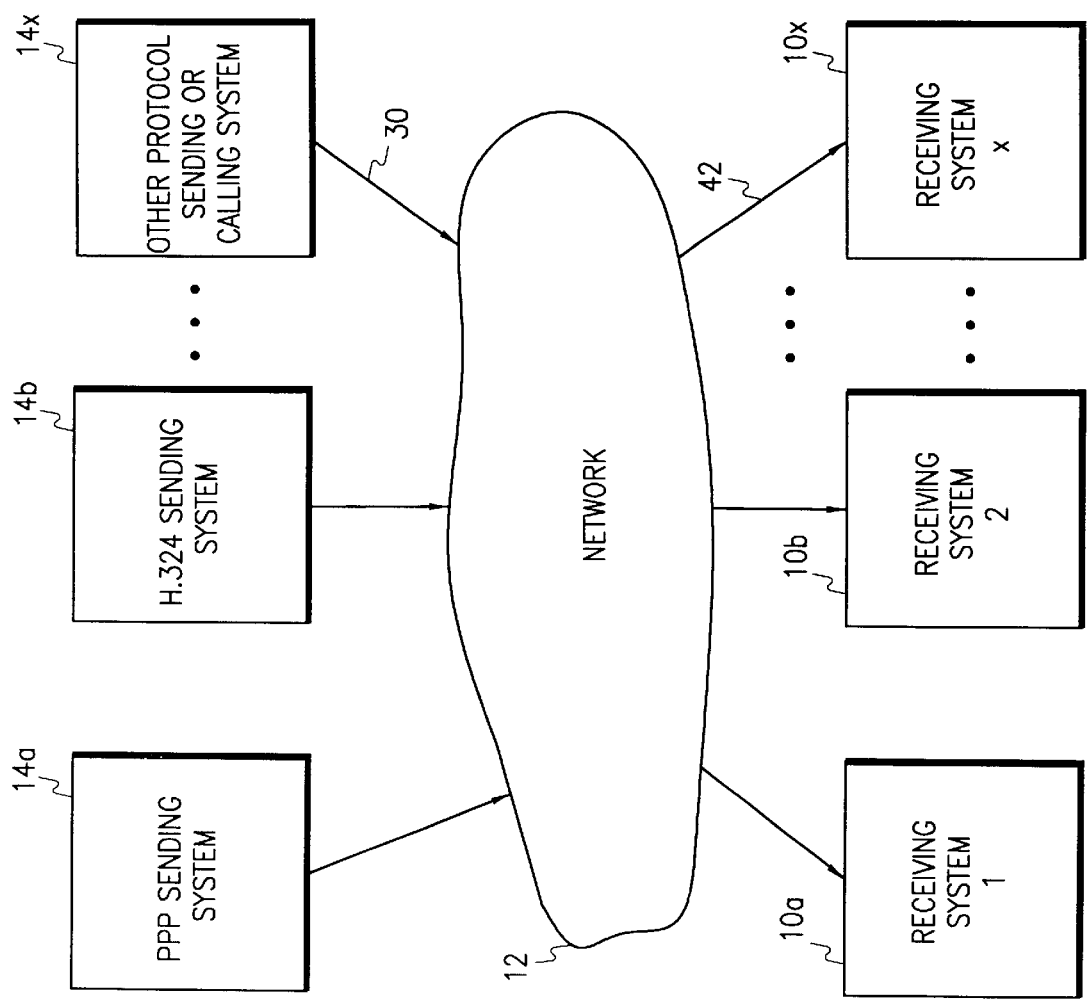
FIG. 1 shows a plurality of receiving systems, some of which are able to receive data according to several data protocols over a network from corresponding sending systems wherein, according to the present invention, a prefix protocol is sent by the sending system prior to sending payload data so that the receiving system can determine whether it can handle the data and/or so that it can prepare for receipt thereof.

FIG. 1 shows a plurality of receiving systems 10a, 10b, . . . , 10x, some of which are able to receive data according to several different protocols over a network 12 from corresponding sending systems 14a, 14b, . . . , 14x, wherein, according to the present invention, a prefix protocol is sent by the sending system prior to sending payload data in a protocol that is not necessarily the same as that of the prefix protocol, so that the receiving system can determine in advance whether it can handle the payload protocol and, in that case, so that it can prepare for synchronized receipt thereof using an appropriate handler.

Figure 2:
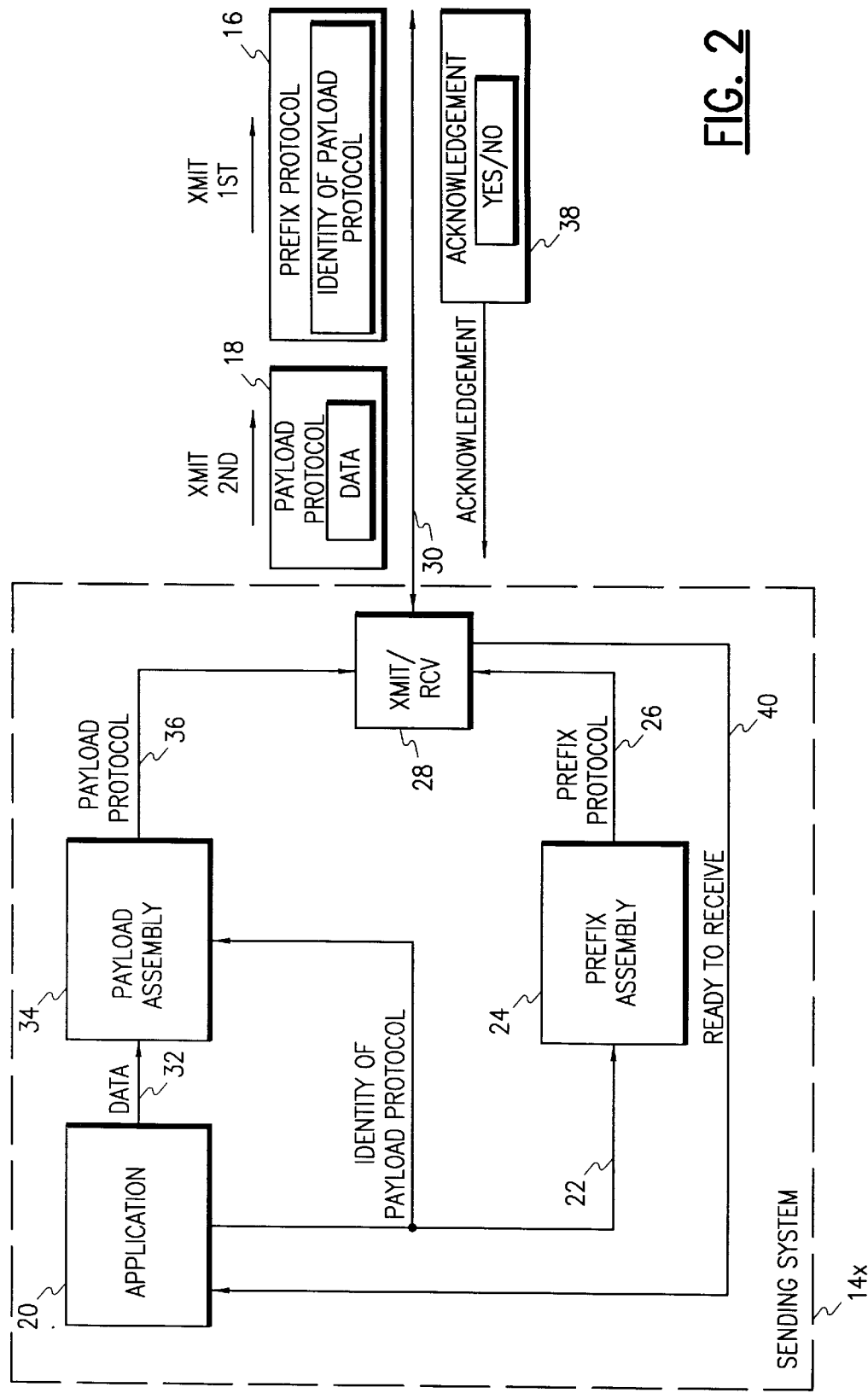
FIG. 2 shows a sending system, such as one of the sending systems of FIG. 1, which is able to send a prefix protocol identifying the type of payload protocol to follow, according to the present invention.

FIG. 2 shows a generalized sending system 14, such as one of the sending systems 14x of FIG. 1, which is able to send one or more prefix protocol packets 16 identifying the type of payload protocol to follow in one or more payload protocol packets 18, according to the present invention. For instance, according to a simple form of the invention, the sending or calling system sends n (with n high enough to allow synchronization) HDLC frames. In the information field of the HDLC frame is a 32-bit field that tells what protocol, i.e., what payload protocol, will start after the n HDLC frames. The prefix protocol is a protocol specified and agreed upon by the whole or at least a large part of the Internet and telecommunication community that will be sent to tell what the type of payload protocol is to be exchanged after the prefix protocol session. The payload protocol is the real protocol that will be exchanged after the prefix protocol session.

After the n HDLC frames, the indicated payload protocol 18 starts operation. It will be appreciated that the receiving system is able to route the data to the right handler easily and quickly by first interpreting the prefix protocol 16.

The information field of the HDLC frame can also contain the number of the remaining prefix protocol frames to make it easier for the router software to give control of the data stream to the right application at the right time. In other words, the number of prefix protocol frames does not have to be fixed, but can be a variable, with a variable number indicated in the information field, or some other field of the HDLC frame, such as the control field. In this simple embodiment of the invention, the sending system will always start sending the payload protocol data after sending the specified amount of the prefix frames.

The generalized sending system 14 of FIG. 2 is shown with an application program 20 that has data that it wants to send to a receiver. Before assembling payload protocol packets, the application provides a signal on a line 22 to a prefix protocol assembly mechanism 24, which identifies the type of payload protocol that is to be used and the number n of prefix protocol frames to be sent. The prefix protocol mechanism 24 provides n HDLC frames with the appropriate flag, address, control and FCS bits, as well as an information field identifying the payload protocol to be used following the specified number of prefix protocol frames. These HDLC frames are provided on a signal line 26 to a transmitter/receiver 28 which transmits the n HDLC prefix protocol frames 16 on a line 30 to the network 12 and thence on to a receiving system indicated in the address field, such as the receiving system 10x.

The application 20 provides the data to be transmitted to the receiving system on a signal line 32 to a payload protocol assembly mechanism 34, which is also responsive to the signal on the line 22 identifying the type of payload protocol to be used. The payload protocol assembly mechanism provides the data embedded in the desired payload protocol on a signal line 36 to the transmitter/receiver 28 for transmission of the one or more payload protocol packets 18 on the line 30 and via the network 12 to the intended receiving system 10x. The payload protocol packet 18 or packets have the data on the line 32 embedded within the payload protocol frame or frames.

In a second, more complex embodiment of the invention, the basic frame format is the same as described above, but also allows a simple acknowledgement message. In this second embodiment, the number of prefix protocol frames to be sent is initially very high—high enough that it allows, for instance, 30 seconds synchronization time. The receiving system sends an acknowledgement HDLC frame 38 on the line 30 back to the sending system when it has been able to detect the payload protocol information from the information fields of the prefix protocol HDLC frames and tells the sending system whether the receiving system can handle that payload protocol or not. The receiving system sends a negative acknowledgement if it does not have a handler for the intended incoming payload protocol. The sending system sends the prefix frames as long as it has not received the acknowledgement frame, or when the large number of prefix frames has been consumed. The sending system will stop sending and close the link connection if it does not receive an acknowledgement frame after all the allowed number of prefix protocol frames have been sent. The sending system stops sending prefix protocol frames and starts to send the payload protocol frame 18 with its embedded data after it has received the acknowledgement frame.

As shown in FIG. 2, an acknowledgment frame 38 is transmitted from the receiving system to the sending system on the line 30. It is received by the transmitter/receiver 28 and provided on a signal line 40 to the application block 20, which then takes appropriate steps to stop the prefix protocol assembly mechanism 24 and to either start the payload protocol assembly mechanism 34 or to close the link connection on the line 30.

Figure 3:
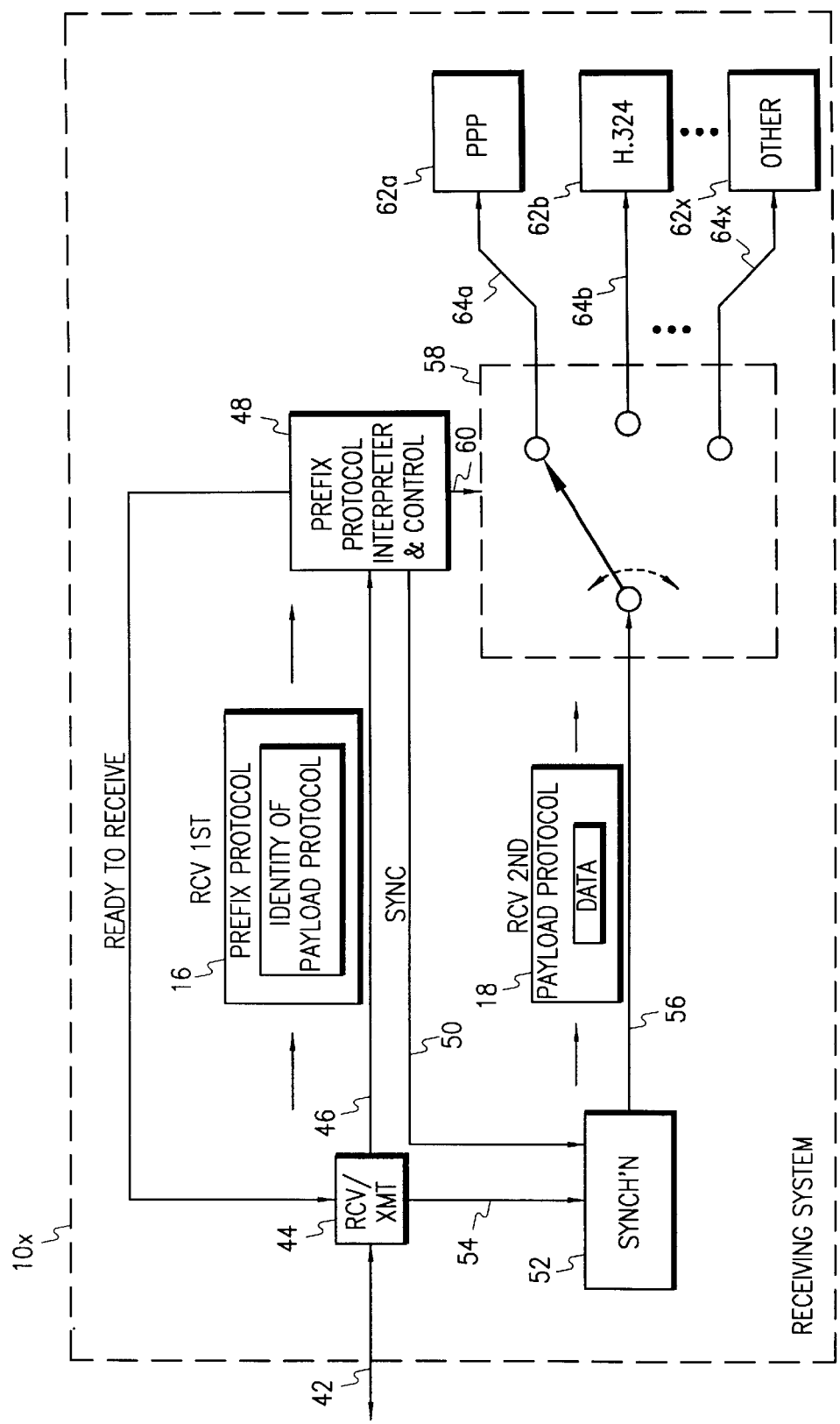
FIG. 3 shows a receiving system, such as one of the receiving systems of FIG. 1, which is able to receive a prefix protocol from a sending system so that it is able to prepare for receipt of the identified payload protocol, according to the present invention.

FIG. 3 shows a generalized receiving system, such as one 10x of the receiving systems of FIG. 1, which is able to receive prefix protocol frames 16 from a sending system 14x so that it is able to prepare for receipt of an identified payload protocol frame or frames, according to the present invention. The receiving system lox of FIG. 3 is shown connected by a signal line 42 to the network 12 of FIG. 1. A receiver/transmitter 44 receives prefix protocol frames 16 from the sending system 14x via the network 12 and provides them on a line 46 to a prefix protocol interpreter and control unit 48. For the first, simple embodiment of the invention described above, the receiving system simply receives the indicated n HDLC prefix protocol frames 16, synchronizes on them and provides a synchronization signal on a line 50 to a synchronization unit 52, which in turn receives the payload protocol frame or frames 18 on a line 54 from the receiver/transmitter 44 over the line 42 from the network, and ultimately from the sending system over the line 30. The synchronized payload protocol frame or frames 18 are provided by the synchronization block 52 on a signal line 56 to a selector block which is shown in stylized fashion in FIG. 3 as a multi-position switch controlled by the prefix protocol interpreter and control block 48 by means of a control signal on a line 60 to instruct the selector block 58 which one of a plurality of handlers 62a, 62b, . . . , 62x to utilize. In other words, if the prefix protocol 16 has indicated that the identity of the payload protocol is an H.324 frame, then the prefix protocol interpreter and control block 48 will instruct the selector 58 over the signal line 60 to switch the incoming payload protocol packet or packets 18 incoming on the line 56 to route them on a signal line 64b so as to be able to be handled properly by an H.324 handler 62b. Other handlers, such as a PPP handler 62a, may be utilized by some other sending system, or even the same sending system using another application program.

Figure 4:
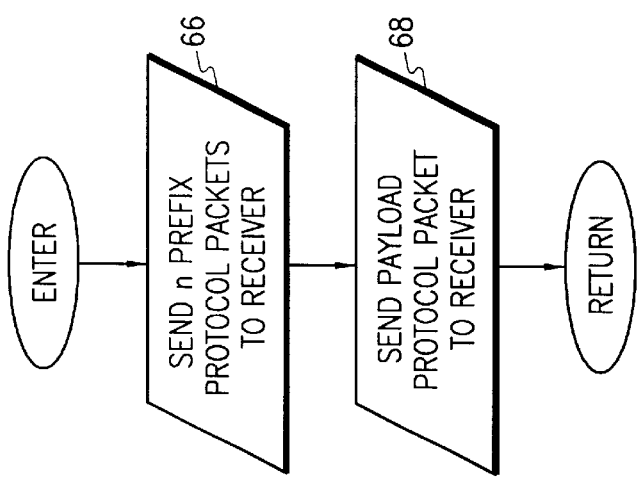
FIG. 4 shows a series of steps which may be carried out in a sending system, such as the sending system of FIG. 2 or any of the sending systems of FIG. 1, according to the present invention.

Referring now to FIG. 4, a simple method for sending information from a sending terminal through a network to a receiving terminal, according to the first embodiment of the present invention, comprises the steps of first sending a selected number (n) of prefix protocol packets having a data field indicative of both a selected number of prefix protocol frames that are to be sent and of the type of payload protocol of a packet to follow the prefix protocol packets through the network to the receiving terminal, as indicated in a step 66, and then sending the payload protocol packet to the receiving terminal immediately after sending the selected number of prefix protocol packets, as indicated in a step 68. The step 66 may be carried out, for instance, by the application program 20 in conjunction with the prefix protocol assembly mechanism 24 and the transmitter 28 of FIG. 2. Similarly, the step 68 may be carried out by the application program 20 in conjunction with the payload protocol assembly mechanism 34 and the transmitter 28. The prefix protocol packets may be in any selected protocol, but HDLC frames are preferred. Following the prefix protocol frames 16 will be a frame or frames of data in the selected payload protocol, such as H.324, PPP, or some other known protocol.

Figure 5:
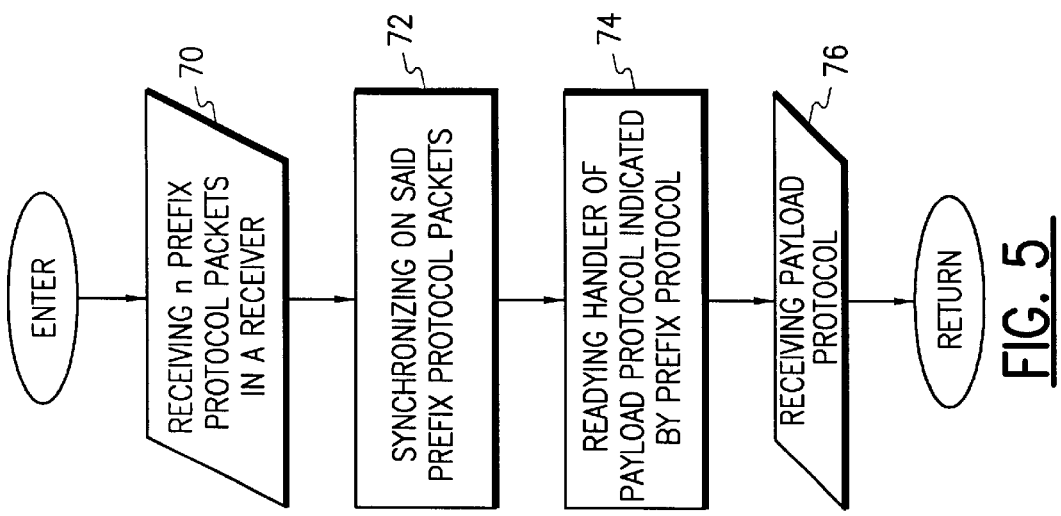
FIG. 5 shows a series of steps which may be carried out in the receiving system of FIG. 3 or any of the receiving systems of FIG. 1, according to the present invention.

Similarly, referring to FIG. 5, according to a simplest first embodiment of the present invention, in a receiving system, a step 70 is first executed to receive the indicated number (n) of prefix protocol packets indicative of a payload protocol packet to follow after the indicated number of prefix protocol packets for synchronizing, as indicated in a step 72, on the prefix protocol packets and for readying, as indicated in a step 74, a handler of the payload protocol packets in the receiving system. The payload protocol packet is then received, as indicated in a step 76 and handled by the handler of such payload protocol packets.

Figure 6:
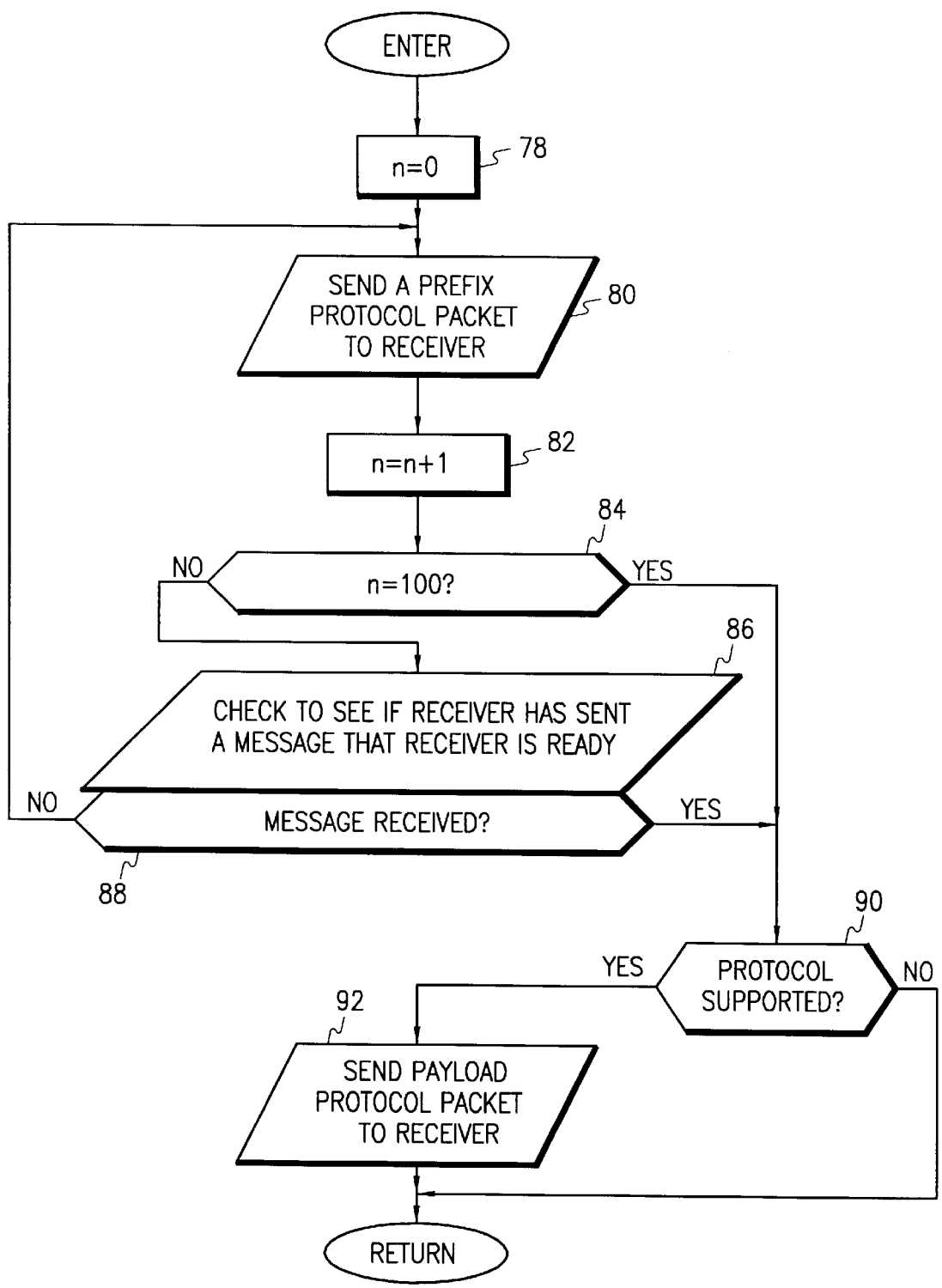
FIG. 6 shows another series of steps which may be carried out in a sending system, such as the sending system of FIG. 2 or any of the sending systems of FIG. 1, according to the present invention.

Referring to FIG. 6, according to a second, more complex embodiment of the invention, where an acknowledgement is sent from the receiving system to the sending system in response to recognized prefix protocol frames, a step 78 is first executed in a sending system, for instance, to set a variable n to zero. A step 80 is next executed to actually send a prefix protocol frame 16 to an addressed receiving system. A step 82 is then executed to increase n by one. A step 84 determines if n has reached a limit, such as a limit that would allow the number of prefix protocol frames that are to be sent to be very high—high enough that it allows, for instance, 30 seconds synchronization time. The number shown in step 84 is arbitrary, however. If the limit has not been reached, a step 86 is next executed to check if the receiving system has sent an acknowledgement message, such as the acknowledgement message 38 of FIG. 2. If not, as determined in a step 88, another prefix protocol frame is sent by executing the step 80 again. This is continued until either the limit indicated in the step 84 is reached, or until an acknowledgement message is detected in the steps 86, 88. In either event, a step 90 will then be executed to determine from the received message 38 if the payload protocol is supported in the receiving terminal. If not, the link on the line 30 is disconnected, and the sending of further packets is terminated by a return, as shown. If so, a step 92 is executed to send the payload protocol packet or packets 18 to the receiving system.

Figure 7A:
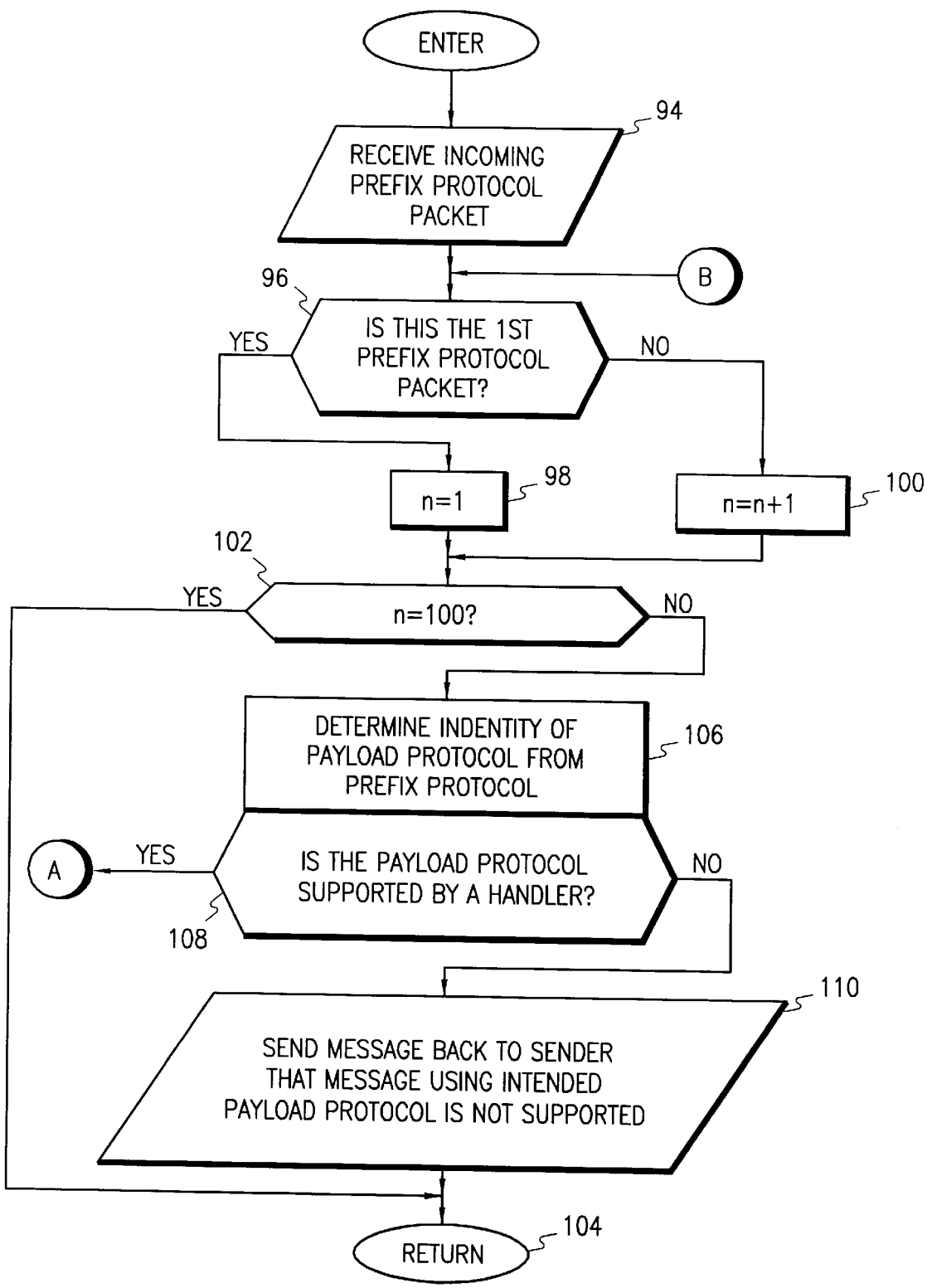
FIGS. 7A and 7B together show another series of steps which may be carried out in a receiving system, such as the receiving system of FIG. 3 or any of the receiving systems of FIG. 1, according to the present invention.
Figure 7B:
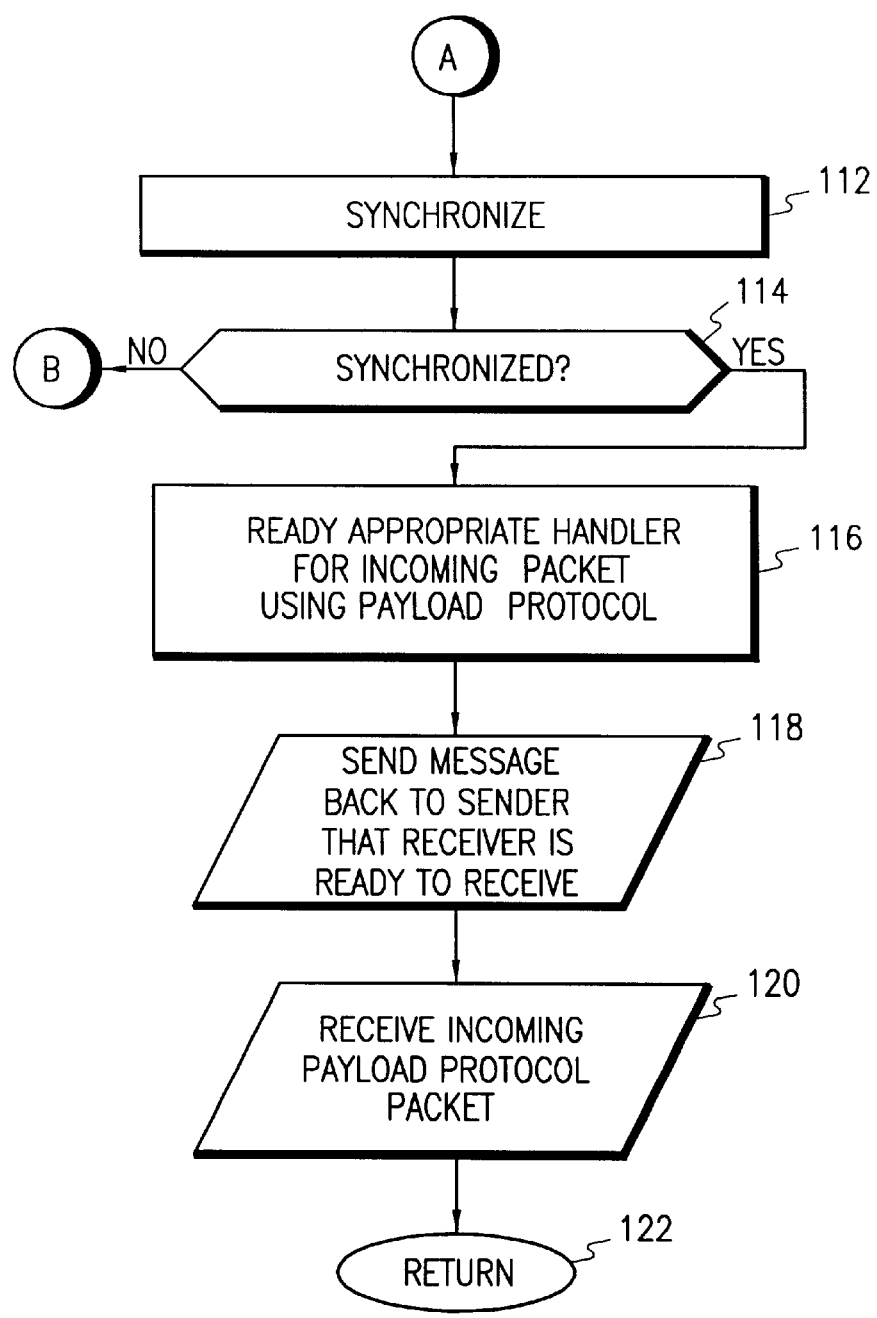

A similar routine for the receiving terminal is shown in FIGS. 7A and 7B. After receiving an incoming prefix protocol packet, as indicated in a step 94, a step 96 is next executed to determine if the incoming packet is the first prefix protocol packet received in a current sequence. If so, a step 98 is executed to set n equal to one. If not, n is increased by one in a step 100. A step 102 is then executed to determine if n has reached the same limit that is used in the step 84 of FIG. 6 at the sending terminal end. If so, a return is made in a step 104. If not, a step 106 is executed to determine the identity of the payload protocol from the prefix protocol. A step 108 is then executed to determine if the payload protocol is supported by a handler within the receiving system. If not, then a message is sent back that the payload protocol is not supported in the receiving system, which causes the sending terminal to stop sending prefix protocol packets and to disconnect the link. If the payload protocol is supported by a handler within the receiving system, synchronization is effected in a step 112. Once synchronization is effected, as determined in a step 114, a step 116 is then executed to ready the appropriate handler for at least one incoming packet, using the payload protocol. A message is then sent back to the sending system that the receiving system is ready to receive payload protocol frames, as indicated in a step 118. A step 120 is then executed to receive the incoming payload protocol packet or packets after the last prefix protocol. A return is then made in a step 122. If, in the step 14, it was determined that synchronization had not yet been achieved, the steps 96, 100, 102, 106, 108, 112 and 114 are re-executed until synchronization is achieved.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for sending payload information from a sending terminal through a network to a receiving terminal, comprising the steps of:

sending a selected number of prefix protocol packets indicative of a payload protocol of a payload protocol packet to follow from said sending terminal with said payload information through said network to said receiving terminal; and sending said payload protocol packet from said sending terminal to said receiving terminal following immediately after sending said selected number of prefix protocol packets.

2. The method of claim 1, wherein said sending of said prefix protocol packets continues up to said selected number unless a message is received from said receiving terminal indicating either (1) that the payload protocol is not supported in the receiving terminal followed by terminating sending of further packets, or (2) that the receiving terminal is ready to receive said payload packet followed by said sending said payload protocol packet after sending a number of prefix protocol packets less than said selected number.

3. Method of receiving payload information in a receiving terminal through a network from a sending terminal comprising the steps of:

receiving a selected number of prefix protocol packets indicative of a payload protocol of a payload protocol packet to follow from said sending terminal with said payload information after said selected number of prefix protocol packets for synchronizing on said prefix protocol packets and for readying a handler of said payload protocol packets with said selected number chosen to allow synchronization; and receiving said payload protocol packet at said receiving terminal from said sending terminal following immediately after said step of receiving said selected number of prefix protocol packets.

4. The method of claim 3, further comprising the steps of:

determining before receiving all of said selected number of prefix protocol packets that said payload protocol is supported in said receiving terminal; and sending a message from said receiving terminal to said sending terminal that said payload protocol is supported in said receiving terminal for causing said sending terminal to stop sending said prefix protocol packets and immediately sending said payload protocol packet.

5. Method of communicating payload information between a sending terminal and a receiving terminal over a network comprises the steps of:

sending a selected number of prefix protocol packets indicative of a payload protocol of a payload protocol packet to follow from said sending terminal through said network to said receiving terminal with said payload information;

receiving in said receiving terminal said selected number of prefix protocol packets indicative of said payload protocol of said payload protocol packet to follow after said selected number of prefix protocol packets for synchronizing on said prefix protocol packets and for readying a handler of said payload protocol packets;

sending said payload protocol packet to said receiver following immediately after sending said selected number of prefix protocol packets; and receiving in said receiving terminal said payload protocol packet.

6. The method of claim 5, further comprising the steps of:

determining in said receiver before receiving all of said selected number of prefix protocol packets that said payload protocol is supported or that said receiver is ready to receive said payload protocol packet and sending a message for causing said sending terminal to stop sending said prefix protocol packets followed by said sending of said payload protocol packet from said sending terminal to said receiving terminal.

7. Terminal for sending payload information through a network to a receiving terminal, comprising:

means for sending a selected number of prefix protocol packets indicative of a payload protocol of a payload protocol packet to follow with said payload information through said network to said receiving terminal; and means for sending said payload protocol packet to said receiving terminal following immediately after sending said selected number of prefix protocol packets.

8. The terminal of claim 7, wherein said sending of said prefix protocol packets continues up to said selected number unless a message is received from said receiving terminal indicating either (1) that the payload protocol is not supported in the receiving terminal followed by terminating sending of further packets, or (2) that the receiving terminal is ready to receive said payload packet followed by said sending said payload protocol packet after sending a number of prefix protocol packets less than said selected number.

9. Terminal for receiving payload information through a network from a sending terminal comprising:

means for receiving a selected number of prefix protocol packets indicative of a payload protocol of a payload protocol packet with said payload information to follow after said selected number of prefix protocol packets for synchronizing on said prefix protocol packets and for readying a handler of said payload protocol packet with said selected number chosen to allow synchronization; and means for receiving said payload protocol packet.

10. The terminal of claim 9, further comprising:

means for determining before receiving all of said selected number of prefix protocol packets that said payload protocol is supported in said receiving terminal; and means for sending a message from said receiving terminal to said sending terminal that said payload protocol is supported in said receiving terminal for causing said sending terminal to stop sending said prefix protocol packets and immediately sending said payload protocol packet.

11. Apparatus comprising a sending terminal and a receiving terminal for communicating payload information over a network, further comprising:

means for sending in said sending terminal a selected number of prefix protocol packets indicative of a payload protocol of a payload protocol packet to follow through said network with said payload information to said receiving terminal;

means for receiving in said receiving terminal said selected number of prefix protocol packets indicative of said payload protocol of said payload protocol packet to follow after said selected number of prefix protocol packets for synchronizing on said prefix protocol packets and for readying a handler of said payload protocol packet;

means for sending in said sending terminal said payload protocol packet with said payload information through said network to said receiving terminal immediately after sending said selected number of prefix protocol packets; and means for receiving in said receiving terminal said payload protocol packet.

12. The apparatus of claim 11, further comprising means for determining in said receiver before receiving all of said selected number of prefix protocol packets that said payload protocol is supported or that said receiver is ready to receive said payload packet and sending a message to said sending terminal for causing said sending terminal to stop sending said prefix protocol packets followed by said sending of said payload protocol packet from said sending terminal to said receiving terminal.

13. The method of claim 1, with the selected number chosen to ensure synchronized receipt of a payload protocol packet at the receiving terminal.

14. The method of claim 13, wherein said step of sending said payload protocol packet is carried out following immediately after sending said selected number of prefix protocol packets regardless of whether or not the receiving terminal responds.

15. The method of claim 1, wherein said step of sending said payload protocol packet is carried out following immediately after sending said selected number of prefix protocol packets regardless of whether or not the receiving terminal responds.

16. The method of claim 5, with said selected number chosen to allow said synchronizing on said prefix protocol packets.

17. The terminal of claim 7, with the selected number chosen to allow synchronized receipt of said payload protocol packet at said receiving terminal.

18. The apparatus of claim 11, wherein said selected number is chosen to allow said synchronizing on said prefix protocol packets.

19. The method of claim 1, wherein said prefix protocol is a high-level data link control (HDLC) and said payload protocol is different from HDLC.

20. The method of claim 3, wherein said prefix protocol is a high-level data link control (HDLC) and said payload protocol is different from HDLC.

21. The method of claim 5, wherein said prefix protocol is a high-level data link control (HDLC) and said payload protocol is different from HDLC.

22. The method of claim 7, wherein said prefix protocol is a high-level data link control (HDLC) and said payload protocol is different from HDLC.

23. The terminal of claim 9, wherein said prefix protocol is a high-level data link control (HDLC) and said payload protocol is different from HDLC.

24. The apparatus of claim 11, wherein said prefix protocol is a high-level data link control (HDLC) and said payload protocol is different from HDLC.

* * * * *